No. 698,647. Patented Apr. 29, 1902.
T. DUNCAN.
ELECTRICAL MEASURING INSTRUMENT.
(Application filed Apr. 22, 1899.)
(No Model.) 3 Sheets—Sheet 1.

No. 692,647. Patented Apr. 29, 1902.
T. DUNCAN.
ELECTRICAL MEASURING INSTRUMENT.
(Application filed Apr. 22, 1899.)

(No Model.) 3 Sheets—Sheet 2.

Witnesses
Samuel R. Bachtel.
Marion Marsh.

By his Attorneys

Inventor

No. 698,647. Patented Apr. 29, 1902.
T. DUNCAN.
ELECTRICAL MEASURING INSTRUMENT.
(Application filed Apr. 22, 1899.)
(No Model.) 3 Sheets—Sheet 3.
Fig. 4.
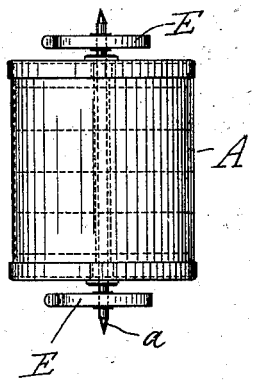
Fig. 5.
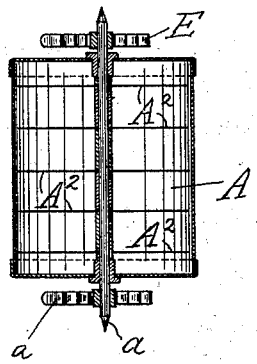
Fig. 6.
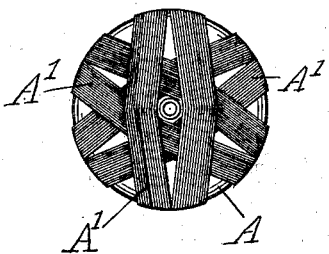
Fig. 7.
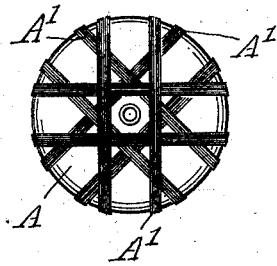
Fig. 8.
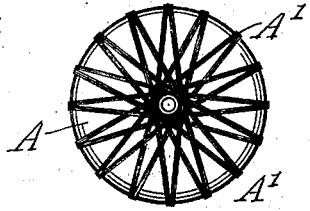
Fig. 9.
Fig. 10.
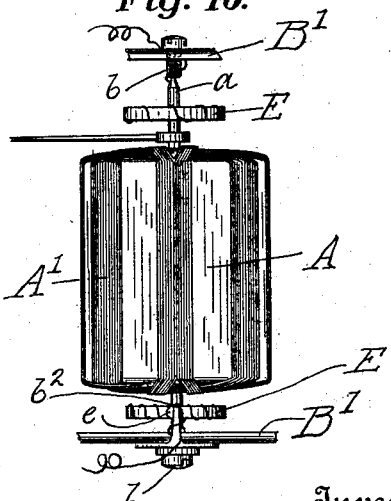
Witnesses
Samuel R. Bachtel.
Marion Marsh.
By his Attorneys
Inventor
Thomas Duncan
Carter & Graves.
THE NORRIS PETERS CO., PHOTO-LITHO., WASHINGTON D C.

UNITED STATES PATENT OFFICE.

THOMAS DUNCAN, OF OAKPARK, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRICAL MEASURING INSTRUMENT.

SPECIFICATION forming part of Letters Patent No. 698,647, dated April 29, 1902.

Application filed April 22, 1899. Serial No. 714,018. (No model.)

*To all whom it may concern:*

Be it known that I, THOMAS DUNCAN, of Oakpark, in the county of Cook and State of Illinois, have invented certain new and useful Improvements in Electrical Measuring Instruments, of which the following is a specification.

This invention relates to improvements in indicating instruments—such as ammeters, voltmeters, wattmeters, and the like—for measuring electric currents; and it has for its object to provide an improved construction in instruments of this character by which a more evenly distributed and increased armature torque is secured without additional expenditure of energy and in which the armature acts both as a motor part and as a drag tending to dampen or check its own movement, and thereby to render the instrument more nearly "dead-beat" in its action.

Figure 1:
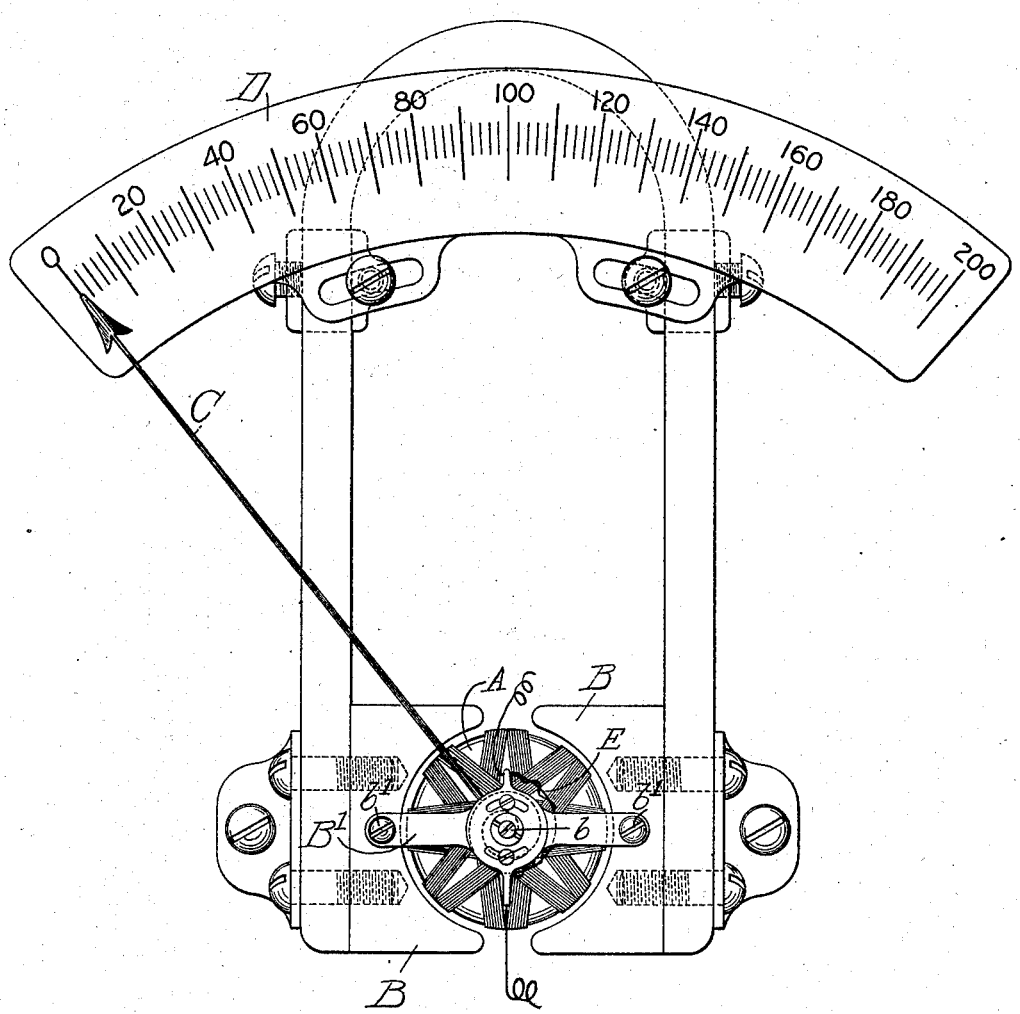
Figure 2:
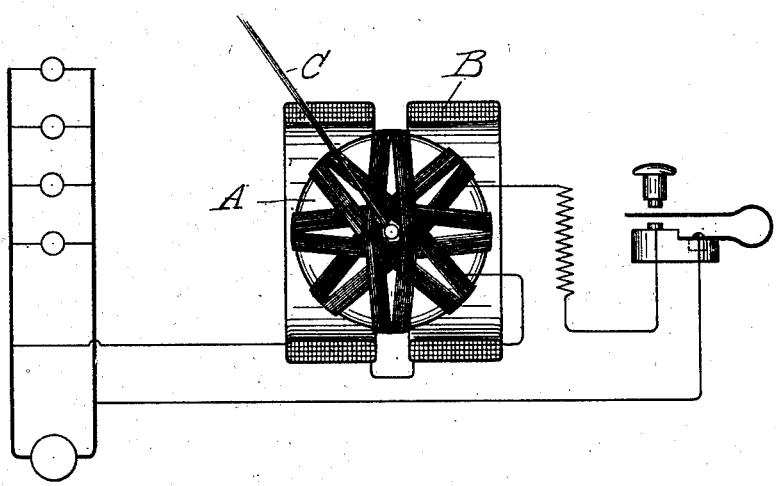
Figure 3:
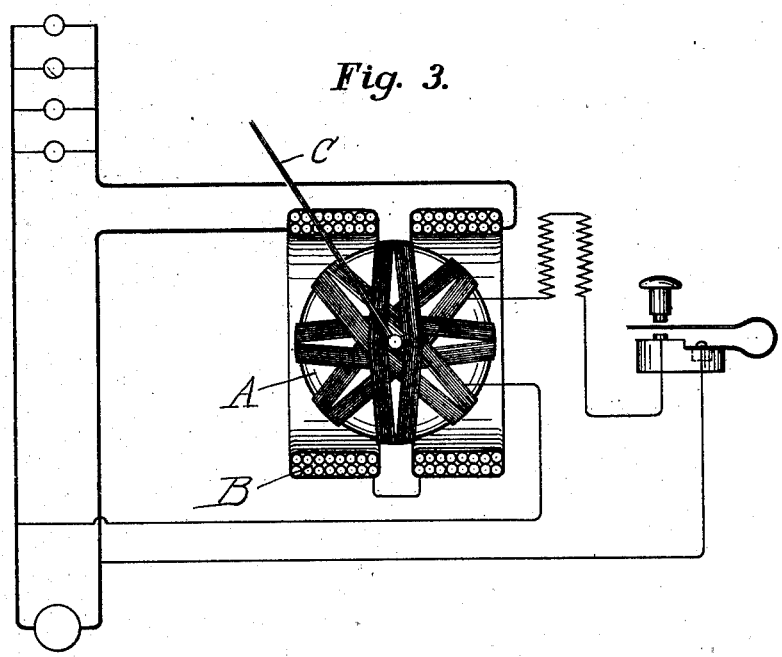

In the accompanying drawings, illustrating some of the forms in which the invention may be practically embodied, Figure 1 is a front elevation of a volt or am meter constructed in accordance with my invention. Fig. 2 is a somewhat diagrammatic view of another form of voltmeter construction. Fig. 3 is a similar view of a wattmeter construction. Fig. 4 is a detail elevation of one form of improved armature-cylinder removed from the instrument. Fig. 5 is an axial section thereof. Figs. 6, 7, and 8 are end views, showing different ways in which the coils may be wound on the armature in accordance with my invention. Fig. 9 is an axial section of another form of armature-cylinder. Fig. 10 shows the details of the armature-mounting in the instrument illustrated in Fig. 1.

The general construction of one form of indicating instrument to which my improvements are applicable is shown in Figs. 1 to 10. A designates an armature that is mounted to rotate between magnetic fields B, and the movements of which armature are indicated by a pointer C upon a conveniently-located scale D, the torque of the armature as energized by the passing current being exerted against the tension of springs E, which are so applied that the amount of armature movement, as indicated by the pointer on the scale, is always proportional to the current strength, pressure, or energy, as the case may be, of the circuit in which the instrument is connected. As herein shown, the armature A is rigidly mounted upon a shaft $a$, which rotates between pivot-bearings $b$, carried by supporting-spiders B', that are in this instance conveniently secured by screws $b'$ to the field-magnets B. The pointer C is rigidly attached to the shaft A, and the springs E are shown as applied between said shaft and the spiders B', adjustment of the tension of the springs being provided for by securing the outer extremity $e$ of each spring to an inwardly-projecting lug or finger $b^2$. These details of the armature-mounting have, however, nothing to do with the present improvements, which particularly concern the constructing and winding of the armature itself. This consists, as herein shown, of a cylinder, of aluminium, copper, or like non-magnetic metal, upon which the armature-coils A' are wound. These coils are shown as three or more in number and are distributed over the surface of the cylinder A, so as to produce as even a torque as possible in all positions of the armature movement. This method of winding also enables the coils to be made very thin, as by but a single layer or so of wire, as shown, so that it is possible to bring the magnetic fields B very close to the armature, and thereby to gain in effective torque in proportions to the decreased air-gap. A fourth and important advantage of this construction of the armature lies in the fact that the varying magnetic flux passing through the walls of the armature as the current varies in the connected circuit sets up eddy-currents in the latter tending to resist its motion and bring it to rest. The armature thus acts automatically as a drag upon its own movement, and the pointer tends to come to rest immediately after responding to the current changes, so that the instrument is rendered dead-beat in its action. This retarding effect may be increased by inserting some magnetic material in the armature to draw the magnetic flux through more strongly. Thus in the construction shown in Figs. 4 and 5 a number of disks $A^2$ are mounted transversely within the cylinder for this purpose, while in Fig. 9 the cylindric armature A is shown as provided with an iron lining $A^3$ to the same end.

In the voltmeter construction shown diagrammatically in Fig. 2 the magnetic fields B are coils, which are connected in series with the armature-coils A' in the shunt-circuit. In the wattmeter shown in Fig. 3 these coils are connected in series in the circuit.

Figs. 6, 7, and 8 show some of the various ways in which the windings can be distributed on the armature, and it will be understood that a great variety of changes may be made in this feature and in the shape of the armature and other details without involving any departure from the invention claimed.

For alternating-current work an armature, of rubber or other non-metallic material, may be used, but obviously without the damping or retarding effect before referred to.

I claim as my invention—

1. An indicating electric meter provided with an armature comprising an outer shell of non-magnetic metal, and an inner lining of magnetic metal, and coils mounted on said armature and connected in the circuit to be measured.

2. In an electric meter, the combination with an armature-winding, of an outer shell of non-magnetic metal fixed with relation to the said winding, and an inner lining of magnetic metal, substantially as described.

3. In an electric meter, the combination with an armature-winding, of an outer shell of non-magnetic metal fixed with relation to the said winding, and an inner body of magnetic metal also fixed with relation to the said winding, substantially as described.

In testimony that I claim the foregoing as my invention I affix my signature, in presence of two subscribing witnesses, this 17th day of April, A. D. 1899.

THOMAS DUNCAN.

Witnesses:
HENRY W. CARTER,
ALBERT H. GRAVES.